United States Patent
Toyoshima

(10) Patent No.: US 6,809,850 B2
(45) Date of Patent: Oct. 26, 2004

(54) ELECTRODE PLATE FOR COLOR DISPLAY UNIT AND PRODUCTION METHOD THEREFOR

(75) Inventor: Takayuki Toyoshima, Osaka-fu (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 78 days.

(21) Appl. No.: 10/226,480

(22) Filed: Aug. 23, 2002

(65) Prior Publication Data

US 2003/0058518 A1 Mar. 27, 2003

Related U.S. Application Data

(63) Continuation of application No. PCT/JP01/11206, filed on Dec. 20, 2001.

(30) Foreign Application Priority Data

Jan. 12, 2001 (JP) .......... 2001-005319

(51) Int. Cl.[7] .......... G02F 1/07; G02F 1/1335; G02B 5/22; G03F 9/00; G03C 1/492
(52) U.S. Cl. .......... 359/259; 359/891; 430/7; 430/271.1; 349/106; 349/113; 156/234
(58) Field of Search .......... 345/105; 156/234; 313/479; 359/259, 359, 890, 891, 892; 430/7, 271.1; 349/106, 107, 110, 113, 192

(56) References Cited

U.S. PATENT DOCUMENTS

| | | | | |
|---|---|---|---|---|
| 5,085,973 A | * | 2/1992 | Shimizu et al. | 430/271.1 |
| 5,889,628 A | * | 3/1999 | Caine | 359/891 |
| 6,239,856 B1 | * | 5/2001 | Imura et al. | 349/192 |
| 6,268,092 B1 | * | 7/2001 | Akashi et al. | 430/7 |
| 6,372,074 B1 | * | 4/2002 | Holguin et al. | 156/234 |
| 6,519,015 B2 | * | 2/2003 | Ono | 349/106 |
| 6,552,765 B2 | * | 4/2003 | Kurata | 349/113 |
| 6,657,687 B2 | * | 12/2003 | Takizawa | 349/106 |
| 6,670,083 B2 | * | 12/2003 | Sekiguchi et al. | 430/7 |

FOREIGN PATENT DOCUMENTS

| | | | | |
|---|---|---|---|---|
| JP | 10-010518 | 1/1998 | | G02F/1/1335 |
| JP | 10-010519 | 1/1998 | | G02F/1/1335 |
| JP | 63-123003 | 5/1998 | | G02B/5/20 |
| JP | 10-319226 | 12/1998 | | G02B/5/20 |

OTHER PUBLICATIONS

Form PCT/ISA/210, (second sheet only). International Search Report dated Mar. 12, 2002 of International Application No. PCT/JP01/11206.

* cited by examiner

Primary Examiner—Loha Ben
(74) Attorney, Agent, or Firm—Edwards & Angell, LLP; David G. Conlin; Richard J. Roos

(57) ABSTRACT

The invention provides an electrode plate for a color display, a manufacturing method thereof, and a color display using the display plate, capable of preventing the physical/chemical damage of a color filter or an organic protective film in a more convenient way and capable of improving the adhesive properties with a conductive film. (1) A method for manufacturing an electrode plate for a color display, wherein a color filter is formed on a substrate, a layer in which the color filter is at least partially carbonized is then formed through processing that uses a discharge under a dry atmosphere having substantially atmospheric pressure, and a transparent conductive film (inorganic conductive film) is formed on the partially carbonized color filter layer, or (2) a method for manufacturing an electrode plate for a color display, wherein a color filter and an organic protective film are sequentially formed on a substrate, an at least partially carbonized layer is then formed on the organic protective film through processing that uses a discharge under a dry atmosphere having substantially atmospheric pressure, and a transparent conductive film (inorganic conductive film) is formed on the partially carbonized organic protective film; an electrode plate obtained according to the manufacturing methods; and a color display using this electrode plate.

16 Claims, 1 Drawing Sheet

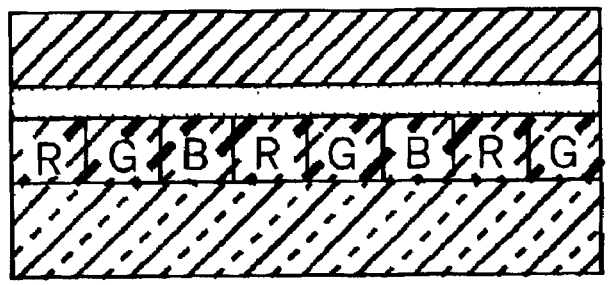

Transparent conductive film
Partially carbonized layer
Color filter
Glass substrate

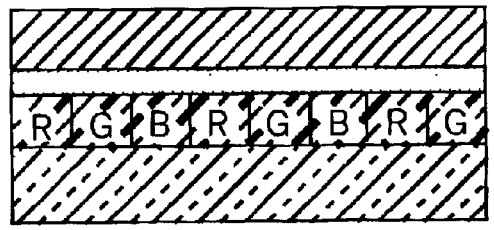

Fig.1

Transparent conductive film
Partially carbonized layer
Color filter
Glass substrate

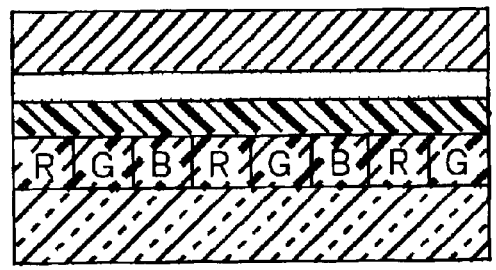

Fig.2

Transparent conductive film
Partially carbonized layer
Organic protective layer
Color filter
Glass substrate

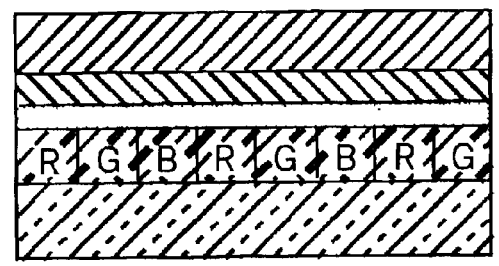

Fig.3

Transparent conductive film
Adherent layer
Partially carbonized layer
Color filter
Glass substrate

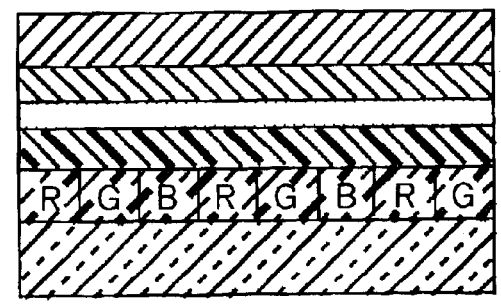

Fig.4

Transparent conductive film
Adherent layer
Partially carbonized layer
Organic protective layer
Color filter
Glass substrate

ELECTRODE PLATE FOR COLOR DISPLAY UNIT AND PRODUCTION METHOD THEREFOR

This application is a continuation of PCT/JP01/11206 filed Dec. 20, 2001.

TECHNICAL FIELD

The present invention relates to an electrode plate for a color display excellent in chemical resistance and in adhesive properties, a method for manufacturing the same, and a color display that uses the electrode plate.

BACKGROUND ART

An electrode plate used for a color display is generally manufactured such that a color filter made from organic resin is formed on a glass substrate, an organic protective film similarly made from organic resin is then applied thereonto, and an inorganic transparent electrode having electric conductivity is formed. The conductive line of the transparent electrode is generally installed such that a uniformly transparent conductive film is first formed, and then wet etching is performed to obtain a desired conductive line shape.

When the wet etching is performed for conductive line processing, various chemicals are used, and therefore there occurs a situation in which the color filter or the transparent organic protective film, which is laid underneath the transparent conductive film, is corroded and invaded by the chemicals. In addition, since the inorganic conductive film is formed on the organic resin film, it is very difficult to give sufficient adhesive properties to be able to endure predetermined processing.

Therefore, conventionally, chemical resistance and adhesive properties have been improved by forming other thin films (silicon dioxide thin films are generally used) between the color filter or the organic protective film and the inorganic conductive film. However, an RF sputtering technique according to which the silicon dioxide thin films are formed has an industrial disadvantage in the fact that film formation speed is slow. Additionally, the RF-plasma prior to forming the silicon dioxide thin film causes the color filter or the organic protective film to receive physical/chemical damage, thus mainly causing instability occurring when electrode plates are manufactured at a post-step (i.e., step of forming the inorganic conductive film after forming the color filter and the organic protective film on the glass substrate).

Further, in order to solve the aforementioned problems, the present inventors have previously invented an electrode plate, etc., capable of preventing physical/chemical damage of a color filter or an organic protective film and capable of improving adhesive properties with an inorganic conductive film by colliding a gas ion that includes an oxygen ion or an argon ion with the color filter or the organic protective film so as to form a layer, in which the color filter or the organic protective film is at least partially carbonized, between the color filter or the organic protective film and the transparent conductive film (Japanese Unexamined Patent Publication No. H 10-10518). Further, in the invention described in this publication, the present inventors have disclosed an Embodiment in which ions are emitted with an ion gun in a vacuum atmosphere as a method for colliding the gas ion that includes the oxygen ion or the argon ion with the color filter or the organic protective film.

According to the invention described in Japanese Unexamined Patent Publication No. H10-10518 that has been made by the present inventors, a layer that has been at least partially carbonized is formed on a color filter or on an organic protective film, and thereby the chemical resistance and adhesive properties of the color filter or the organic protective film can be enormously improved without forming a transparent inorganic thin film, such as a silicon dioxide thin film, which has been conventionally required, on these films, and a transparent electrode film (inorganic conductive film) with a desired pattern has come to be easily processed.

However, since the method performed by the present inventors includes a step of processing under a vacuum atmosphere, it is difficult to process a large amount of electrode plate materials under the vacuum, and, disadvantageously, this leads to a decrease in productivity. Additionally, since the method includes processing under the vacuum, an expensive apparatus is required to manufacture the electrode plate. Therefore, disadvantageously, this raises the manufacturing costs of products to be obtained.

DISCLOSURE OF THE INVENTION

It is therefore an object of the present invention to obtain a manufacturing method for an electrode plate for a color display according to which a color filter or an organic protective film is more easily prevented from receiving physical/chemical damage and according to which adhesive properties with a conductive film are improved. Another object of the present invention is to, in the manufacturing method for the electrode plate, protect a color filter or an organic protective film in an easier way when a transparent conductive film is formed by wet etching. Still another object of the present invention is to obtain an electrode plate for a color display that does not use a transparent inorganic thin film like a silicon dioxide thin film, which has generally conventionally been used, between a color filter or an organic protective film and an inorganic conductive thin film, and is to obtain a color display using the electrode plate.

The aforementioned problems of the present invention are solved by the following manufacturing methods (1) and (2), by an electrode plate for a color display obtained by these manufacturing methods, and by a color display that uses the electrode plate.

(1) A method for manufacturing an electrode plate for a color display by sequentially forming a color filter and a transparent conductive film on a substrate, comprising the steps of: forming a color filter on a substrate; thereafter forming a layer in which said color filter is at least partially carbonized through processing that uses a discharge under a dry atmosphere having substantially atmospheric pressure; and forming a transparent conductive film on the partially carbonized color filter layer.

(2) A method for manufacturing an electrode plate for a color display by sequentially forming a color filter, an organic protective film for protecting the color filter, and a transparent conductive film on a substrate, comprising of: sequentially forming a color filter and an organic protective film on a substrate; thereafter forming an at least partially carbonized layer on said organic protective film through processing that uses a discharge under a dry atmosphere having substantially atmospheric pressure; and forming a transparent conductive film on the partially carbonized organic protective film.

According to the invention of the method (1), by performing processing that uses a discharge under a dry atmosphere having substantially atmospheric pressure, a partially carbonized color filter layer can be formed on a color filter without the necessity of expensive vacuum processing equipment, and, as a result, the color filter is prevented from receiving physical/chemical damage, and adhesive properties with the transparent conductive film (inorganic conductive film) formed thereon can be improved.

Similarly, according to the invention of the method (2), by performing the processing that uses a discharge under a dry atmosphere having substantially atmospheric pressure, a partially carbonized organic protective film layer can be formed on an organic protective film without the necessity of expensive vacuum processing equipment, and, as a result, the organic protective film is prevented from receiving physical/chemical damage, and adhesive properties with the transparent conductive film (inorganic conductive film) formed thereon can be improved.

If carbonization that uses a discharge is applied onto a color filter or onto an organic protective film under an ordinary atmospheric pressure, the color filter or the organic protective film will receive chemical damage, and, as a result, an electrode plate for a color display that is inferior in alkali resistance will be produced. However, the present inventors pre-dry the atmosphere, and perform processing that uses a corona discharge or perform atmospheric plasma treatment in that atmosphere. Thereby, the present inventors have found that the color filter or the organic protective film is prevented from receiving physical/chemical damage, and adhesive properties with the transparent conductive film formed thereon can be improved, and have completed the present invention.

It is difficult to, at present, give a clear description of a technical reason for the aforementioned phenomenon found by the present inventors. Presumably, it seems that water molecules contained in an ordinary atmosphere are ionized by a corona discharge or by atmospheric plasma, so as to exert some physical or chemical adverse influence on a color filter or on an organic protective film.

The term "substantially atmospheric pressure" mentioned herein means atmospheric pressure or pressure that has been reduced within a structurally reasonable range of processing equipment that uses a discharge in order to facilitate the start/continuance of the discharge.

There are various possible methods in order to obtain a dry atmosphere having substantially atmospheric pressure. The easiest method is to provide such a processing tank as to cover a necessary part of a processing unit that uses a discharge of the processing equipment and to purge the inside thereof by dry air through a moisture absorbing agent or by dry gas used in a process.

From the viewpoint that a discharge device is handy/universal or can perform consecutive processing, processing that uses a corona discharge or atmospheric plasma processing is preferably used as processing that uses the discharge.

When the corona discharge processing is performed, a general discharge processing unit that includes a discharge electrode, a dielectric, and a high frequency power-supply unit can be used. Concerning the processing condition of the corona discharge, its optimum condition depends on the structure of the discharge-processing unit. Desirably, the output is 0.1 kW to 1.5 kW, and, more desirably, 0.2 kW to 1.2 kW. If processing that uses an extremely excessive discharge is performed, a color filter and an organic protective film will be damaged, and physical, chemical durability might be deteriorated on the contrary.

Concerning the distance between a discharge electrode and a substrate with a color filter or a substrate in which a color filter is coated with an organic protective film, its optimum condition depends on the structure of a device for discharge processing. If less than 5 mm, the color filter or the organic protective film will be damaged, and the physical, chemical durability of an obtained film that includes a carbonized layer will be deteriorated on the contrary. Special limitations are not imposed on the processing time that uses a discharge, except that at least a part of the surface of a color filter or an organic protective film can be substantially carbonized during the processing time. However, there is a case in which carbonization increases excessively when the processing time using the discharge exceeds one minute.

When the atmospheric plasma processing is performed, a general discharge processing unit that is made up of a power-supply unit, a discharge electrode, a gas-introducing tube, a chamber, etc., can be used. This discharge-processing unit is provided with a pair of opposing surfaces, at least one of which is provided with a solid dielectric. A pair of metal electrodes is disposed in the vicinity of the other one of the pair of surfaces, and a space between the metal electrodes through which a color filter or an organic protective film can be passed is provided. A voltage is applied between the electrodes while the color filter or the organic protective film is passing therebetween, so as to generate plasma.

A pulsed electric field, as well as an AC waveform, can be used as an electric field applied between the electrodes. Concerning the processing condition of the atmospheric plasma processing, its optimum condition depends on the structure of the discharge-processing unit. If processing that uses an extremely excessive discharge is performed, a color filter and an organic protective film will be damaged, and physical, chemical durability might be deteriorated on the contrary.

Processing gas used for the atmospheric plasma processing is not limited to a specific one. For example, argon, helium, nitrogen, air, oxygen, etc., can be mentioned as the processing gas. Rare gases, such as argon and helium, are more desirable because they do not exert a great influence on the color filter and on the organic protective film, and can perform stable processing. These may be used as a single gas or as a mixture of two or more gases.

Desirably, the acceleration voltage is 5 kV to 20 kV, and, more desirably, 8 kV to 15 kV. If processing that uses an extremely excessive discharge is performed, the color filter and the organic protective film will be damaged, and physical, chemical durability might be deteriorated on the contrary. Special limitations are not imposed on the processing time, except that the surface of the film to be processed can be substantially carbonized during the processing time. However, there is the possibility that carbonization will increase excessively when the processing time using the discharge exceeds one minute.

Desirably, in the present invention of the aforementioned methods (1) and (2), an adherent layer made of any of the compounds of a metallic oxide, a metallic nitride, and a metallic oxynitride is disposed between the transparent conductive film and the partially carbonized layer, in order to improve the adhesive properties between the transparent conductive film and the partially carbonized layer.

Since the adhesive properties between the transparent conductive film and the partially carbonized layer are improved by disposing an adherent layer made of any of the compounds of a metallic oxide, a metallic nitride, and a metallic oxynitride between the transparent conductive film and the partially carbonized layer, the form accuracy of an end of the conductive line pattern obtained when an electrode conductive line pattern by wet etching is formed is more reliably improved in comparison with a case where the adherent layer is not disposed. This means that the margin of the optimum processing condition of the processing using the discharge extends.

A transparent metallic oxide film, a transparent metallic nitride film, and a transparent metallic acid nitride film, such as silicon dioxide, tantalate, aluminum oxide, silicon nitride, acid silicon nitride, titanium oxide, and zirconia, can be mentioned as the adherent layer made of any of the compounds of a metallic oxide, a metallic nitride, and a metallic oxynitride. A vacuum deposition method, a DC magnetron sputtering method, a RF magnetron sputtering method, etc., are used as the film formation method for the adherent layer. In consideration of an influence on the partially carbonized layer given when the film is formed or in consideration of easy applicability to the enlargement of the substrate, a desirable method is a film formation method for the adherent layer of silicon dioxide, tantalate, silicon nitride, or acid silicon nitride that uses the DC magnetron sputtering method. A voltage to be applied onto a cathode may be continuously applied, or may be pulsedly applied. Any of the aforementioned electric-charge applying methods is appropriately selected in accordance with the component of a selected adherent layer.

In the present invention of the methods (1) and (2), the ratio (Ic-c/Icoo) of a signal (Ic-c) resulting from a C—C bond to a signal (Icoo) resulting from a carboxyl group according to X-ray photoelectron spectroscopy in the carbonized layer may be set to be greater than that in a color filter or an organic protective film that has not been carbonized.

In the electrode plate for the color display of the present invention, the fact that the ratio (Ic-c/Icoo) of the carbonized layer is greater than that of the color filter or the organic protective film that has not been carbonized means that a carbonized layer has been formed.

The partially carbonized layer of the present invention is not necessarily required to be a uniformly carbonized layer. The carbonized layer may be nonuniform in thickness as long as it has chemical resistance more than a required level. However, it is undesirable that the carbonized layer is extremely thick, because the carbonized layer absorbs visible light, and thereby transmittance decreases. Further, it is undesirable that carbonization extremely advances, because the adhesive properties between the carbonized layer and the thin film layer formed thereon are diminished.

A color filter, which is an aim of the present invention, can be made from any resin, as long as it is a resin that transmits light having a predetermined wavelength independently of a film formation method or a coloring method. Further, an organic protective film, which is an aim of the present invention, is generally made from an acrylic resin, a polyimide resin, an epoxy resin, or a mixture of these resins. However, it can be made from any resin, as long as protective properties to be an object of the present invention are satisfied thereby.

A film in which a complex oxide that includes at least two of indium, tin, and zinc, a zinc oxide doped with tin or aluminum, or a metal film that includes at least one of gold, silver, copper, and platinum that have low electric resistance is sandwiched by a transparent metallic oxide film like an indium oxide is used as a transparent conductive film that can be used in the present invention. However, any material can be used, as long as it is a conductive film that has transparency, which is an aim of the present invention. A material to be used is not limited to a specific one.

The electrode plate for the color display of the present invention has sections shown in FIG. 1 through FIG. 4. In the electrode plate of the present invention, an at least partially carbonized layer between a color filter or an organic protective film and a transparent electrode or an at least partially carbonized layer between a color filter or an organic protective film and an adherent layer serves to protect a base placed thereunder from suffering physical/chemical damage.

According to the present invention, chemical resistance/adhesive properties required in post-processing can be greatly improved by using an electrode plate for a color display provided with a color filter or provided with an organic protective film whose surface has been carbonized at least partially. The at least partially carbonized surface can be formed by corona discharge or by plasma processing under substantially atmospheric pressure. This makes it unnecessary to use processing equipment which is expensive and is incapable of performing a huge amount of processing because of the processing conventionally carried out under a vacuum atmosphere, and, as a result, manufacturing costs can be reduced.

BRIEF DESCRIPTION OF THE DRAWINGS

FIG. 1 is a sectional view showing one embodiment of an electrode plate for a color display of the present invention.

FIG. 2 is a sectional view showing one embodiment of an electrode plate for a color display of the present invention.

FIG. 3 is a sectional view showing one embodiment of an electrode plate for a color display of the present invention.

FIG. 4 is a sectional view showing one embodiment of an electrode plate for a color display of the present invention.

BEST MODE FOR CARRYING OUT THE INVENTION

Embodiments of the present invention will be described with reference to the drawings. The present invention will be hereinafter described in more detail in accordance with the following Examples.

EXAMPLE 1

A gelatinous color filter was formed on a glass substrate according to a conventional method, and a glass substrate with a color filter was manufactured. When the surface of this color filter was measured by X-ray photoelectron spectroscopy, the ratio (Ic-c/Icoo) of a signal (Ic-c) resulting from a C—C bond to a signal (Icoo) resulting from a COO bond that was obtained by the analysis of the detected signal C1s was 4.22.

Corona discharge processing was applied to this glass substrate for 30 seconds in an electric field of 0.5 kW. In this case, a part to be processed was enclosed, and its inside was purged by dry air so as to remove internal water prior to the corona discharge processing. The distance between an electrode and the substrate was set to be 10 mm. When the surface of this color filter was measured by X-ray photoelectron spectroscopy, the ratio (Ic-c/Icoo) of a signal (Ic-c) resulting from a C—C bond to a signal (Icoo) resulting from a COO bond that was obtained by the analysis of the detected signal C1s was 17.91, and thereby it was confirmed that the surface of the color filter was carbonized.

After confirmation of the aforementioned phenomenon, corona discharge processing was similarly applied to another newly manufactured glass substrate with the color filter for 30 seconds in an electric field of 0.5 kW. Immediately thereafter, this glass substrate was introduced into a vacuum tank, and a complex oxide (hereinafter referred to as ITO) of 90 weight percent indium oxide-10 weight percent tin oxide was formed with a thickness of 300 nm according to the DC magnetron sputtering method. This substrate was extracted from the vacuum tank, and was soaked into a 5 weight percent sodium hydroxide water solution of 40° C. As a result, the peeling of the ITO was not confirmed though it was soaked for 20 minutes or more. Further, wet etching that uses hydrochloric acid and iron chloride water solution was applied to the electrode plate manufactured by the aforementioned method for electrode formation. As a result, an electrode having a desired shape could be obtained. This performance was improved much more than Comparative Examples 1 and 3 described later.

EXAMPLES 2 TO 5

A glass substrate with a color filter was obtained in the same way as in Example 1, except that the processing condition of the corona discharge was set as shown in Table 1.

When the surfaces of these color filters were measured by X-ray photoelectron spectroscopy, the ratio (Ic-c/Icoo) of a signal (Ic-c) resulting from a C—C bond to a signal (Icoo) resulting from a COO bond that was obtained by analysis of the detected signal C1s was as shown in Table 1, and thereby it was confirmed that the surface of the color filter was carbonized.

After confirmation of the aforementioned phenomenon, corona discharge processing was applied to another newly manufactured glass substrate with the color filter under the processing condition of the corona discharge shown in Table 1. Immediately thereafter, this glass substrate was introduced into the vacuum tank, and the ITO was formed with a thickness of 300 nm according to the DC magnetron sputtering method. This substrate was extracted from the vacuum tank, and was soaked into a 5 weight percent sodium hydroxide water solution of 40° C. As a result, alkali resistance was relatively improved in comparison with Comparative Examples 1 and 3 described later. Further, wet etching that uses hydrochloric acid and iron chloride water solution was applied to the electrode plate manufactured by the aforementioned method for electrode formation. As a result, an electrode having a substantially desired shape could be obtained.

However, in Example 5 in which the irradiation condition for carbonization is severest, the partial carbonization of the color filter obviously advances in comparison with Comparative Examples 1 and 3, and therefore adhesive properties with the ITO are improved much more than Comparative Examples 1 and 3. However, in Example 5, the partial carbonization of the color filter advances in comparison with Example 2 in which the irradiation condition of carbonization is the mildest, and therefore extremely slight peeling at a pattern end that seems to result from a decrease in adhesive properties with the ITO was visually confirmed.

Example 6

A gelatinous color filter was formed on a glass substrate, and a glass substrate with a color filter was manufactured. Trimesic acid anhydride, which is a hardening agent, was added to polyglycidyl methacrylate, which is an acrylic organic resin, from thereabove, and was burnt for one hour at 200° C. When the surface of this organic protective film was measured by X-ray photoelectron spectroscopy, the ratio (Ic-c/Icoo) of a signal (Ic-c) resulting from a C—C bond to a signal (Icoo) resulting from a COO bond that was obtained by analysis of the detected signal C1s was 4.93.

Corona discharge processing was applied to this glass substrate for 30 seconds in an electric field of 0.5 kW. When the surface of this organic protective film was measured by X-ray photoelectron spectroscopy, the ratio (Ic-c/Icoo) of a signal (Ic-c) resulting from a C—C bond to a signal (Icoo) resulting from a COO bond that was obtained by the analysis of the detected signal C1s was 24.40, and thereby it was confirmed that the surface of the organic protective film was carbonized.

After confirmation of the aforementioned phenomenon, corona discharge processing was similarly applied to another newly manufactured glass substrate with the color filter and with the organic protective film for 30 seconds in an electric field of 0.5 kW. In this case, a part to be processed was enclosed, and its inside was purged by dry air so as to remove internal water prior to the corona discharge processing. The distance between an electrode and the substrate was set to be 10 nm. Immediately thereafter, this glass substrate was introduced into the vacuum tank, and the ITO was formed with a thickness of 300 nm according to the DC magnetron sputtering method. This substrate was extracted from the vacuum tank, and was soaked into a 5 weight percent sodium hydroxide water solution of 40° C. As a result, the peeling of the ITO was not confirmed though it was soaked for 20 minutes or more. Further, wet etching that uses hydrochloric acid and iron chloride water solution was applied to the electrode plate manufactured by the aforementioned method for electrode formation. As a result, an electrode having a substantially desired shape could be obtained. This performance was improved much more than Comparative Examples 2 and 4 described later.

EXAMPLES 7 to 10

A glass substrate with a color filter and with an organic protective film was obtained in the same way as in Example 6, except that the processing condition of the corona discharge was set as shown in Table 1.

When the surfaces of these organic protective films were measured by X-ray photoelectron spectroscopy, the ratio (Ic-c/Icoo) of a signal (Ic-c) resulting from a C—C bond to a signal (Icoo) resulting from a COO bond that was obtained by analysis of the detected signal C1s was as shown in Table 1, and thereby it was confirmed that the surface of the organic protective film was carbonized. However, in Example 10 in which the irradiation condition is severest, clear coloring appeared on the surface of the organic protective film.

After confirmation of the aforementioned phenomenon, corona discharge processing was similarly applied to another newly manufactured glass substrate with the color filter and with the organic protective film under the processing condition of the corona discharge shown in Table 1. Immediately thereafter, this glass substrate was introduced into the vacuum tank, and the ITO was formed with a thickness of 300 nm according to the DC magnetron sputtering method. This substrate was extracted from the vacuum tank, and was soaked into a 5 weight percent sodium hydroxide water solution of 40° C. As a result, alkali resistance was relatively improved in comparison with Comparative Examples 2 and 4 described later. Further, wet etching that uses hydrochloric acid and iron chloride water solution was applied to the electrode plate manufactured by the aforementioned method for electrode formation. As a result, an electrode having a substantially desired shape could be obtained. However, in Example 10 in which the irradiation condition for carbonization is the severest, the partial carbonization of the organic protective film obviously advances in comparison with Comparative Examples 2 and 4, and therefore adhesive properties with the ITO are improved much more than Comparative Examples 2 and 4. However, in Example 10, the partial carbonization of the organic protective film advances in comparison with Example 7 in which the irradiation condition of carbonization is the mildest, and therefore extremely slight peeling at a pattern end that seems to result from a decrease in adhesive properties with the ITO was visually confirmed.

EXAMPLE 11

A gelatinous color filter was formed on a glass substrate according to a conventional method, and a glass substrate with a color filter was manufactured. When the surface of this color filter was measured by X-ray photoelectron spectroscopy, the ratio (Ic-c/Icoo) of a signal (Ic-c) resulting from a C—C bond to a signal (Icoo) resulting from a COO bond that was obtained by the analysis of the detected signal C1s was 4.22.

Plasma processing was applied to this glass substrate for 20 seconds by use of argon as processing gas, by application of a voltage of 11 kV at atmospheric pressure, by application of a pulsed electric field of a frequency of 6 kHz, and by use of alumina as a solid dielectric. In this case, a part to be processed was enclosed, and its inside was purged by dry air so as to remove internal water, prior to the plasma processing. When the surface of this color filter was measured by X-ray photoelectron spectroscopy, the ratio (Ic-c/Icoo) of a signal (Ic-c) resulting from a C—C bond to a signal (Icoo) resulting from a COO bond that was obtained by the analysis of the detected signal C1s was 19.12, and thereby it was confirmed that the surface of the color filter was carbonized.

After confirmation of the aforementioned phenomenon, plasma processing was applied to another newly manufactured glass substrate with a color filter for 20 seconds by use of argon as processing gas, by application of a voltage of 11 kV at atmospheric pressure, by application of a pulsed electric field of frequency of 6 kHz, and by use of alumina as a solid dielectric in the same way as above. Immediately thereafter, this glass substrate was introduced into the vacuum tank, and the ITO was formed with a thickness of 300 nm according to the DC magnetron sputtering method. This substrate was then extracted from the vacuum tank, and was soaked into a 5 weight percent sodium hydroxide water solution of 40° C. As a result, the peeling of the ITO was not confirmed though it was soaked for 20 minutes or more. Further, wet etching that uses hydrochloric acid and iron chloride water solution was applied to the electrode plate manufactured by the aforementioned method for electrode formation. As a result, an electrode having a desired shape could be obtained. This performance was improved far superior to Comparative Examples 1 and 5 described later.

Examples 12 to 15

A glass substrate with a color filter was obtained in the same way as in Example 11, except that the processing condition of the plasma processing was set as shown in Table 2.

When the surfaces of these color filters were measured by X-ray photoelectron spectroscopy, the ratio (Ic-c/Icoo) of a signal (Ic-c) resulting from a C—C bond to a signal (Icoo) resulting from a COO bond that was obtained by the analysis of the detected signal C1s was as shown in Table 2, and thereby it was confirmed that the surface of the color filter was carbonized.

After confirmation of the aforementioned phenomenon, plasma processing was similarly applied to another newly manufactured glass substrate with a color filter under the processing condition of the plasma processing shown in Table 2. Immediately thereafter, this glass substrate was introduced into the vacuum tank, and the ITO was formed with a thickness of 300 nm according to the DC magnetron sputtering method. This substrate was then extracted from the vacuum tank, and was soaked into a 5 weight percent sodium hydroxide water solution of 40° C. As a result, alkali resistance was relatively improved in comparison with Comparative Examples 1 and 5 described later. Further, wet etching that uses hydrochloric acid and iron chloride water solution was applied to the electrode plate manufactured by the aforementioned method for electrode formation. As a result, an electrode having a desired shape could be obtained. However, in Example 15 in which the irradiation condition is severest, the partial carbonization of the color filter obviously advances in comparison with Comparative Examples 1 and 5, and therefore adhesive properties with the ITO are improved far superior to Comparative Examples 1 and 5. However, in Example 15, the partial carbonization of the color filter advances in comparison with Example 12 in which the irradiation condition of carbonization is mildest, and therefore extremely slight peeling at a pattern end that seems to result from a decrease in adhesive properties with the ITO was visually confirmed.

EXAMPLE 16

A gelatinous color filter was formed on a glass substrate, and a glass substrate with a color filter was manufactured. Trimesic acid anhydride, which is a hardening agent, was added and applied to polyglycidyl methacrylate, which is an acrylic organic resin, from thereabove, and was burnt for one hour at 200° C. When the surface of this organic protective film was measured by X-ray photoelectron spectroscopy, the ratio (Ic-c/Icoo) of a signal (Ic-c) resulting from a C—C bond to a signal (Icoo) resulting from a COO bond that was obtained by the analysis of the detected signal C1s was 4.93.

Plasma processing was applied to this glass substrate for 20 seconds by use of argon as processing gas, by application of a voltage of 11 kV at atmospheric pressure, by application of a pulsed electric field of a frequency of 6 kHz, and by use of alumina as a solid dielectric. In this case, a part to be processed was enclosed, and its inside was purged by dry air so as to remove internal water, prior to the plasma processing. When the surface of this organic protective film was measured by X-ray photoelectron spectroscopy, the ratio (Ic-c/Icoo) of a signal (Ic-c) resulting from a C—C bond to a signal (Icoo) resulting from a COO bond that was obtained by the analysis of the detected signal C1s was 24.30, and thereby it was confirmed that the surface of the organic protective film was carbonized.

After confirmation of the aforementioned phenomenon, plasma processing was applied to another newly manufactured glass substrate with a color filter and with an organic protective film for 20 seconds by application of a voltage of 11 kV at atmospheric pressure, by application of a pulsed electric field of a frequency of 6 kHz, and by use of alumina as a solid dielectric in the same way as above. Immediately thereafter, this glass substrate was introduced into the vacuum tank, and the ITO was formed with a thickness of 300 nm according to the DC magnetron sputtering method. This substrate was then extracted from the vacuum tank, and was soaked into a 5 weight percent sodium hydroxide water solution of 40° C. As a result, the peeling of the ITO was not confirmed though it was soaked for 20 minutes or more. Further, wet etching that uses hydrochloric acid and iron chloride water solution was applied to the electrode plate manufactured by the aforementioned method for electrode formation. As a result, an electrode having a desired shape could be obtained. These performances were improved far superior to Comparative Examples 2 and 6 described later.

EXAMPLES 17 TO 20

A glass substrate with a color filter and with an organic protective film was obtained in the same way as in Example 16, except that the processing condition of the plasma processing was set as shown in Table 2.

When the surface of this organic protective film was measured by X-ray photoelectron spectroscopy, the ratio (Ic-c/Icoo) of a signal (Ic-c) resulting from a C—C bond to a signal (Icoo) resulting from a COO bond that was obtained by analysis of the detected signal C1s was as shown in Table 2, and thereby it was confirmed that the surface of the organic protective film was carbonized. However, in Example 18 in which the irradiation condition is severest, clear coloring appeared on the surface of the organic protective film.

After confirmation of the aforementioned phenomenon, plasma processing was applied to another newly manufactured glass substrate with a color filter and with an organic protective film under the processing condition of the plasma processing shown in Table 2. Immediately thereafter, this glass substrate was introduced into the vacuum tank, and the ITO was formed with a thickness of 300 nm according to the DC magnetron sputtering method. This substrate was extracted from the vacuum tank, and was soaked into a 5 weight percent sodium hydroxide water solution of 40° C. As a result, alkali resistance was relatively improved in comparison with Comparative Examples 2 and 6 described later. Further, wet etching that uses hydrochloric acid and iron chloride water solution was applied to the electrode plate manufactured by the aforementioned method for electrode formation. As a result, an electrode having a desired shape could be obtained. However, in Example 20 in which the irradiation condition is severest, partial carbonization obviously advances in comparison with Comparative Examples 2 and 6, and therefore adhesive properties with the ITO are improved far superior to Comparative Examples 2 and 6. However, in Example 20, the partial carbonization of the color filter advances in comparison with Example 17 in which the irradiation condition of carbonization is gentlest, and therefore extremely slight peeling at a pattern end that seems to result from a decrease in adhesive properties was visually confirmed.

EXAMPLE 21

A substrate with a color filter was obtained under the same processing condition of the corona discharge as in Example 5 (in which extremely slight peeling was found at the pattern end in the electrode formation by wet etching).

As in Example 5, the ratio (Ic-c/Icoo) of the surface of the color filter was 23.84, and it was confirmed that the surface of the color filter was carbonized.

An adherent layer consisting of $SiO_2$ shown in Table 3 was formed with a thickness of 10 nm onto another newly manufactured glass substrate with a color filter according to a reactive DC magnetron sputtering method with metallic silicon as a target and by use of oxygen as reactant gas, and an ITO was formed with a thickness of 300 nm from thereabove according to the DC magnetron sputtering method. These substrates were extracted from the vacuum tank, and were soaked into a 5 weight percent sodium hydroxide water solution of 400° C. As a result, alkali resistance was relatively improved in comparison with Comparative Example 7 described later. Further, wet etching that uses hydrochloric acid and iron chloride water solution was applied to the electrode plate manufactured by the aforementioned method for electrode formation. As a result, an electrode having a desired shape in which no peeling appears at the pattern end in comparison with Example 5 could be obtained. Presumably, the reason is that, in Example 5, corona discharge processing was strongly performed so that the adhesive properties of an interface between the carbonized layer and the ITO slightly decreased, but, in this Example, the adherent layer was inserted to the interface so as to serve to compensate a decrease in the adhesive properties of Example 5.

EXAMPLE 22

A substrate with a color filter and with an organic protective film was obtained under the same processing condition of the corona discharge as in Example 10 (in which extremely slight peeling was found at the pattern end in the electrode formation by wet etching).

After confirmation of the aforementioned phenomenon, it was confirmed that the ratio (Ic-c/Icoo) of the newly manufactured surface with the color filter and with the organic protective film was 29.59 as in Example 10, and the surface of the organic protective film was carbonized.

After confirmation of the aforementioned phenomenon, an adherent layer consisting of $Ta_2O_5$ shown in Table 3 was formed with a thickness of 10 nm onto another newly manufactured glass substrate with a color filter and with an organic protective film according to the reactive DC magnetron sputtering method, with metallic tantalum as a target, and by use of oxygen as reactant gas. Thereafter, an ITO was formed with a thickness of 300 nm from thereabove according to the DC magnetron sputtering method. These substrates were extracted from the vacuum tank, and were soaked into a 5 weight percent sodium hydroxide water solution of 40° C. As a result, alkali resistance was relatively improved in comparison with Comparative Example 8 described later. Further, wet etching that uses hydrochloric acid and iron chloride water solution was applied to the electrode plate manufactured by the aforementioned method for electrode formation. As a result, an electrode having a desired shape in which no peeling appears at the pattern end in comparison with Example 10 could be obtained. Presumably, the reason is that, in Example 10, corona discharge processing was strongly performed so as to remove the adhesive properties of the interface between the carbonized layer and the ITO, but, in this Example, the adherent layer was inserted to the interface so as to serve to compensate a decrease in the adhesive properties of Example 10.

EXAMPLES 23 AND 24

A color filter and a color filter/organic protective film were subjected to the same processing as in Examples 21 and 22, and a glass substrate with the color filter and a glass substrate with the color filter/organic protective film were obtained.

The surface of the glass substrate with the color filter and the surface of the glass substrate with the color filter/organic protective film were subjected to corona discharge processing under the condition shown in Table 3. When the surfaces were measured by X-ray photoelectron spectroscopy, the ratios (Ic-c/Icoo) of signals (Ic-c) resulting from a C—C bond to signals (Icoo) resulting from a COO bond that were obtained by analysis of the detected signal C1s were 23.84 and 29.59, respectively, and thereby it was confirmed that the surface of the color filter was carbonized.

After confirmation of the aforementioned phenomenon, another newly manufactured glass substrate with a color filter and another newly manufactured glass substrate with a color filter and with an organic protective film were immediately introduced into the vacuum tank. Adherent layers consisting of $Si_3N_4$ and $SiO_xN_y$, respectively, shown in Table 3 were given according to the reactive DC magnetron sputtering method in which metallic silicon is set as a target and in which nitrogen in Example 23 and mixed gas of oxygen and nitrogen in Example 24 are each used as reactant gas. Thereafter the ITO was formed with a thickness of 300 nm according to the DC magnetron sputtering method.

The substrate was extracted from the vacuum tank, and was soaked into a 5 weight percent sodium hydroxide water solution of 40° C. As a result, alkali resistance was relatively improved in comparison with Comparative Examples 9 and 10 described later. Further, wet etching that uses hydrochloric acid and iron chloride water solution was applied to the electrode plate manufactured by the aforementioned method for electrode formation. As a result, an electrode having a desired shape could be obtained.

EXAMPLES 25 THROUGH 28

A color filter and a color filter/organic protective film were subjected to the same processing as in Example 15 or Example 20 (in which only slight peeling was found at the pattern end in the electrode formation by wet etching), and a glass substrate with the color filter and a glass substrate with the color filter/organic protective film were obtained.

The surface of the glass substrate with the color filter and the surface of the glass substrate with the color filter/organic protective film were subjected to plasma processing under the condition shown in Table 4. When the surfaces were measured by X-ray photoelectron spectroscopy, the ratios (Ic-c/Icoo) of signals (Ic-c) resulting from a C—C bond to signals (Icoo) resulting from a COO bond that were obtained by analysis of the detected signal C1s were as shown in Table 4, and thereby it was confirmed that the surface of the organic protective film was carbonized.

After confirmation of the aforementioned phenomenon, another newly manufactured glass substrate with a color filter and another newly manufactured glass substrate with a color filter and with an organic protective film were introduced into the vacuum tank. An adherent layer shown in Table 4 was given, and thereafter the ITO was formed with a thickness of 300 nm according to the DC magnetron sputtering method.

The substrate was extracted from the vacuum tank, and was soaked into a 5 weight percent sodium hydroxide water solution of 40° C. As a result, an electrode having a desired shape in which no peeling appears at the pattern end in comparison with Example 15 or Example 20 could be obtained. Presumably, the reason is that, in Example 15 or Example 20, plasma processing was strongly performed so as to remove the adhesive properties of the interface between the carbonized layer and the ITO, but, in Examples 25 through 28, the adherent layer was inserted to the interface so as to serve to compensate a decrease in the adhesive properties of Example 15 or Example 20.

Comparative Example 1

An electrode plate for a color display was obtained in the same way as in Example 1, except that neither corona discharge nor plasma processing was applied. When the surface of the organic protective film was measured by X-ray photoelectron spectroscopy, the ratio (Ic-c/Icoo) of a signal (Ic-c) resulting from a C—C bond to a signal (Icoo) resulting from a COO bond that was obtained by analysis of the detected signal C1s was 4.22.

The substrate was extracted from the vacuum tank, and was soaked into a 5 weight percent sodium hydroxide water solution of 40° C. Five minutes after it was soaked thereinto, the peeling of the ITO was visually confirmed. Further, wet etching that uses hydrochloric acid and iron chloride water solution was applied to the electrode plate manufactured by the aforementioned method for electrode formation. A situation in which chemicals were soaking from the edge of the pattern was observed, and, as a result, the peeling of the ITO occurred at the edge, and an electrode having a desired shape could not be obtained.

Comparative Example 2

An electrode plate for a color display was obtained in the same way as in Example 6, except that neither corona discharge nor plasma processing was applied. When the surface of the organic protective film was measured by X-ray photoelectron spectroscopy, the ratio (Ic-c/Icoo) of a signal (Ic-c) resulting from a C—C bond to a signal (Icoo) resulting from a COO bond that was obtained by the analysis of the detected signal C1s was 4.93.

The substrate was extracted from the vacuum tank, and was soaked into a 5 weight percent sodium hydroxide water solution of 40° C. Five minutes after it was soaked thereinto, the peeling of the ITO was visually confirmed. Further, wet etching that uses hydrochloric acid and iron chloride water solution was applied to the electrode plate manufactured by the aforementioned method for electrode formation. A situation in which chemicals were soaking from the edge of the pattern was observed, and, as a result, the peeling of the ITO occurred at the edge, and an electrode having a desired shape could not be obtained.

Comparative Example 3

An electrode plate for a color display was obtained in the same way as in Example 1, except that the purge of a processing atmosphere was not carried out by dry air. When the surface of the color filter was measured by X-ray photoelectron spectroscopy, the ratio (Ic-c/Icoo) of a signal (Ic-c) resulting from a C—C bond to a signal (Icoo) resulting from a COO bond that was obtained by the analysis of the detected signal C1s was 4.12, and it was confirmed that the surface in this example was not carbonized in comparison with the surface of the color filter to which corona discharge processing was applied in the atmosphere of dry air.

The substrate was extracted from the vacuum tank, and was soaked into a 5 weight percent sodium hydroxide water solution of 40° C. Five minutes after it was soaked thereinto, the peeling of the ITO was visually confirmed. Further, wet etching that uses hydrochloric acid and iron chloride water solution was applied to the electrode plate manufactured by the aforementioned method for electrode formation. A situation in which chemicals were soaking from the edge of the pattern was observed, and, as a result, the peeling of the ITO occurred at the edge, and an electrode having a desired shape could not be obtained.

Comparative Example 4

An electrode plate for a color display was obtained in the same way as in Example 6, except that the purge of a processing atmosphere was not carried out by dry air. When the surface of the organic protective film was measured by X-ray photoelectron spectroscopy, the ratio (Ic-c/Icoo) of a signal (Ic-c) resulting from a C—C bond to a signal (Icoo) resulting from a COO bond that was obtained by the analysis of the detected signal C1s was 4.58, and it was confirmed that the surface in this example was not carbonized in comparison with the surface of the organic protective film to which corona discharge processing was applied in the atmosphere of dry air.

The substrate was extracted from the vacuum tank, and was soaked into a 5 weight percent sodium hydroxide water solution of 40° C. Five minutes after it was soaked thereinto, the peeling of the ITO was visually confirmed. Further, wet etching that uses hydrochloric acid and iron chloride water solution was applied to the electrode plate manufactured by the aforementioned method for electrode formation. A situation in which chemicals were soaking from the edge of the pattern was observed, and, as a result, the peeling of the ITO occurred at the edge, and an electrode having a desired shape could not be obtained.

Comparative Example 5

An electrode plate for a color display was obtained in the same way as in Example 11, except that the purge of a processing atmosphere was not carried out by dry air. When the surface of the color filter was measured by X-ray photoelectron spectroscopy, the ratio (Ic-c/Icoo) of a signal (Ic-c) resulting from a C—C bond to a signal (Icoo) resulting from a COO bond that was obtained by the analysis of the detected signal C1s was 4.01, and it was confirmed that the surface in this example was not carbonized in comparison with the surface of the color filter to which plasma processing was applied in the atmosphere of dry argon.

The substrate was extracted from the vacuum tank, and was soaked into a 5 weight percent sodium hydroxide water solution of 40° C. Five minutes after it was soaked thereinto, the peeling of the ITO was visually confirmed. Further, wet etching that uses hydrochloric acid and iron chloride water solution was applied to the electrode plate manufactured by the aforementioned method for electrode formation. A situation in which chemicals were soaking from the edge of the pattern was observed, and, as a result, the peeling of the ITO occurred at the edge, and an electrode having a desired shape could not be obtained.

Comparative Example 6

An electrode plate for a color display was obtained in the same way as in Example 16, except that the purge of a processing atmosphere was not carried out by dry air. When the surface of the organic-protective film was measured by X-ray photoelectron spectroscopy, the ratio (Ic-c/Icoo) of a signal (Ic-c) resulting from a C—C bond to a signal (Icoo) resulting from a COO bond that was obtained by the analysis of the detected signal C1s was 4.91, and it was confirmed that the surface in this example was not carbonized in comparison with the surface of the organic protective film to which plasma processing was applied in the atmosphere of dry argon.

The substrate was extracted from the vacuum tank, and was soaked into a 5 weight percent sodium hydroxide water solution of 40° C. Five minutes after it was soaked thereinto, the peeling of the ITO was visually confirmed. Further, wet etching that uses hydrochloric acid and iron chloride water solution was applied to the electrode plate manufactured by the aforementioned method for electrode formation. A situation in which chemicals were soaking from the edge of the pattern was observed, and, as a result, the peeling of the ITO occurred at the edge, and an electrode having a desired shape could not be obtained.

Comparative Examples 7 through 10

An electrode plate for a color display was obtained under the condition corresponding to each of Examples 21 through 24, except that materials shown in Table 5 were used as adherent layers, and neither corona discharge nor plasma processing was applied.

The substrate was extracted from the vacuum tank, and was soaked into a 5 weight percent sodium hydroxide water solution of 40° C. Five minutes after it was soaked thereinto, the peeling of the ITO was visually confirmed. Further, wet etching that uses hydrochloric acid and iron chloride water solution was applied to the electrode plate manufactured by the aforementioned method for electrode formation. A situation in which chemicals were soaking from the edge of the pattern was observed, and, as a result, the peeling of the ITO occurred at the edge, and an electrode having a desired shape could not be obtained.

TABLE 1

|  | Color filter | Organic protective film | Corona discharge condition | Ic-c/Icoo | Alkali resistance | Patterning |
|---|---|---|---|---|---|---|
| Example 1 | Gelatin | None | 0.5 kW, 30 seconds | 17.91 | ● | ● |
| Example 2 | Gelatin | None | 0.2 kW, 5 seconds | 5.78 | ○ | ○ |
| Example 3 | Gelatin | None | 0.7 kW, 20 seconds | 17.55 | ○ | ○ |
| Example 4 | Gelatin | None | 0.8 kW, 30 seconds | 19.12 | ● | ○ |
| Example 5 | Gelatin | None | 1.2 kW, 30 seconds | 23.84 | ○ | Δ |
| Example 6 | Gelatin | Polyglycidyl methacrylate | 0.5 kW, 30 seconds | 24.40 | ● | ● |
| Example 7 | Gelatin | Polyglycidyl methacrylate | 0.2 kW, 5 seconds | 8.11 | ○ | ○ |
| Example 8 | Gelatin | Polyglycidyl methacrylate | 0.7 kW, 20 seconds | 23.80 | ● | ● |

TABLE 1-continued

|  | Color filter | Organic protective film | Corona discharge condition | Ic-c/Icoo | Alkali resistance | Patterning |
|---|---|---|---|---|---|---|
| Example 9 | Gelatin | Polyglycidyl methacrylate | 0.8 kW, 30 seconds | 26.41 | ● | ○ |
| Example 10 | Gelatin | Polyglycidyl methacrylate | 1.2 kW, 30 seconds | 29.59 | ○ | Δ |
| Comparative Example 1 | Gelatin | None | None | 4.22 | x | x |
| Comparative Example 2 | Gelatin | Polyglycidyl methacrylate | None | 4.93 | x | x |

TABLE 2

|  | Color filter | Organic protective film | Plasma processing condition | Ic-c/Icoo | Alkali resistance | Patterning |
|---|---|---|---|---|---|---|
| Example 11 | Gelatin | None | Ar, 11 kV, 20 seconds | 19.12 | ● | ● |
| Example 12 | Gelatin | None | Ar, 8 kV, 5 seconds | 6.66 | ○ | ○ |
| Example 13 | Gelatin | None | He, 10 kV, 10 seconds | 20.90 | ● | ○ |
| Example 14 | Gelatin | None | $N_2$, 10 kV, 10 seconds | 20.10 | ● | ○ |
| Example 15 | Gelatin | None | Ar, 15 kV, 30 seconds | 27.66 | ○ | Δ |
| Example 16 | Gelatin | Polyglycidyl methacrylate | Ar, 11 kV, 20 seconds | 24.30 | ● | ● |
| Example 17 | Gelatin | Polyglycidyl methacrylate | Ar, 8 kV, 5 seconds | 9.01 | ○ | ○ |
| Example 18 | Gelatin | Polyglycidyl methacrylate | He, 10 kV, 10 seconds | 25.70 | ● | ● |
| Example 19 | Gelatin | Polyglycidyl methacrylate | $N_2$, 10 kV, 20 seconds | 24.57 | ● | ○ |
| Example 20 | Gelatin | Polyglycidyl methacrylate | Ar, 15 kV, 30 seconds | 32.91 | ○ | Δ |
| Comparative Example 1 | Gelatin | None | None | 4.22 | x | x |
| Comparative Example 2 | Gelatin | Polyglycidyl methacrylate | None | 4.93 | x | x |

TABLE 3

|  | Color filter | Organic protective film | Corona discharge condition | Ic-c/Icoo | Adherent layer | Alkali resistance | Patterning |
|---|---|---|---|---|---|---|---|
| Example 21 | Gelatin | None | 1.2 kW, 30 seconds | 23.84 | $SiO_2$ | ○ | ● |
| Example 22 | Gelatin | Polyglycidyl methacrylate | 1.2 kW, 30 seconds | 29.59 | $Ta_2O_5$ | ● | ● |
| Example 23 | Gelatin | None | 1.2 kW, 30 seconds | 23.84 | $Si_3N_4$ | ● | ● |
| Example 24 | Gelatin | Polyglycidyl methacrylate | 1.2 kW, 30 seconds | 29.59 | $SiO_xN_y$ | ● | ● |

TABLE 4

|  | Color filter | Organic protective film | Plasma processing condition | Ic-c/Icoo | Adherent layer | Alkali resistance | Patterning |
|---|---|---|---|---|---|---|---|
| Example 25 | Gelatin | None | Ar, 15 kV, 30 seconds | 27.66 | $SiO_2$ | ○ | ● |
| Example 26 | Gelatin | Polyglycidyl methacrylate | Ar, 15 kV, 30 seconds | 32.91 | $Ta_2O_5$ | ● | ● |

TABLE 4-continued

| | Color filter | Organic protective film | Plasma processing condition | Ic-c/Icoo | Adherent layer | Alkali resistance | Patterning |
|---|---|---|---|---|---|---|---|
| Example 27 | Gelatin | None | Ar, 15 kV, 30 seconds | 27.66 | $Si_3N_4$ | ● | ● |
| Example 28 | Gelatin | Polyglycidyl methacrylate | Ar, 15 kV, 30 seconds | 32.91 | $SiO_xN_y$ | ● | ● |

TABLE 5

| | Color filter | Organic protective film | Surface processing condition | Ic-c/Icoo | Adherent layer | Alkali resistance | Patterning |
|---|---|---|---|---|---|---|---|
| Comparative Example 1 | Gelatin | None | None | 4.22 | None | x | x |
| Comparative Example 2 | Gelatin | Polyglycidyl methacrylate | None | 4.93 | None | x | x |
| Comparative Example 3 | Gelatin | None | Corona, 0.5 kW, 30 seconds (ordinary atmosphere) | 4.12 | None | x | x |
| Comparative Example 4 | Gelatin | Polyglycidyl methacrylate | Corona, 0.5 kW, 30 seconds (ordinary atmosphere) | 4.58 | None | x | x |
| Comparative Example 5 | Gelatin | None | Ar, 11 kV, 20 seconds (ordinary atmosphere) | 4.01 | None | x | x |
| Comparative Example 6 | Gelatin | Polyglycidyl methacrylate | Ar, 11 kV, 20 seconds (ordinary atmosphere) | 4.91 | None | x | x |
| Comparative Example 7 | Gelatin | None | None | 4.22 | $SiO_2$ | x | x |
| Comparative Example 8 | Gelatin | Polyglycidyl methacrylate | None | 4.93 | $Ta_2O_5$ | x | x |
| Comparative Example 9 | Gelatin | None | None | 4.22 | $Si_3N_4$ | x | x |
| Comparative Example 10 | Gelatin | Polyglycidyl methacrylate | None | 4.93 | $SiO_xN_y$ | x | x |

Alkali Resistance Evaluation

Determination was made according to whether peeling occurs when it is soaked in a 5 mass percent sodium hydroxide water solution of 40° C. for 20 minutes.

Example in which peeling cannot be visually discerned at all: ● (acceptance);

Example in which only slight film float (puff) is discerned: ○ (acceptance);

Example in which films obviously peel off: x (rejection).

Patterning Evaluation

Determination was made according to the line shape obtained when wet etching that uses hydrochloric acid and iron chloride water solution is applied for 10 minutes for the electrode formation of 70 μm line/20 μm space pitch.

Example in which accurate electrode patterns are formed: ● (acceptance);

Example in which electrode patterns are slightly over-etching: ○ (acceptance);

Example in which only slight peeling occurs at the end of an electrode pattern: Δ (acceptance);

Example in which electrode patterns obviously peel off: x (rejection).

What is claimed is:

1. A method for manufacturing an electrode plate for a color display by sequentially forming a color filter and a transparent conductive film on a substrate, comprising the steps of:

forming a color filter on a substrate; thereafter forming a layer in which said color filter is at least partially carbonized through processing that uses a discharge under a dry atmosphere having substantially atmospheric pressure; and forming a transparent conductive film on the partially carbonized color filter layer.

2. The method for manufacturing an electrode plate for a color display as recited in claim 1, comprising the steps of:

forming an adherent layer made of any of the compounds of a metallic oxide, a metallic nitride, and a metallic oxynitride on the partially carbonized color filter layer; and further forming a transparent conductive film thereon.

3. The method for manufacturing an electrode plate for a color display as recited in claim 1 or 2, wherein the ratio (Ic-c/Icoo) of a signal (Ic-c) resulting from a C—C bond to a signal (Icoo) resulting from a carboxyl group according to X-ray photoelectron spectroscopy in the carbonized color filter layer is set to be greater than that in a color filter layer that has not been carbonized.

4. A method for manufacturing an electrode plate for a color display by sequentially forming a color filter, an organic protective film for protecting the color filter, and a transparent conductive film on a substrate, comprising of:

sequentially forming a color filter and an organic protective film on a substrate;

thereafter forming an at least partially carbonized layer on said organic protective film through processing that uses a discharge under a dry atmosphere having substantially atmospheric pressure; and forming a transparent conductive film on the partially carbonized organic protective film.

5. The method for manufacturing an electrode plate for a color display as recited in claim 4, comprising of: forming an adherent layer made of any of the compounds of a metallic oxide, a metallic nitride, and a metallic oxynitride on the partially carbonized organic protective film; and further forming a transparent conductive film thereon.

6. The method for manufacturing an electrode plate for a color display as recited in claim 4 or 5, wherein the ratio (Ic-c/Icoo) of a signal (Ic-c) resulting from a C—C bond to a signal (Icoo) resulting from a carboxyl group according to X-ray photoelectron spectroscopy in the partially carbonized organic protective film is set to be greater than that in an organic protective film that has not been carbonized.

7. An electrode plate for a color display in which a transparent conductive film is formed on a color filter, wherein said electrode plate has a layer, in which said color filter is at least partially carbonized, that is formed through processing that uses a discharge under a dry atmosphere having substantially atmospheric pressure between said color filter and said transparent conductive film.

8. The electrode plate for a color display as recited in claim 7, wherein an adherent layer made of any of the compounds of a metallic oxide, a metallic nitride, and a metallic oxynitride is disposed between said transparent conductive film and said partially carbonized layer.

9. The electrode plate for a color display as recited in claim 8, wherein the ratio (Ic-c/Icoo) of a signal (Ic-c) resulting from a C—C bond to a signal (Icoo) resulting from a carboxyl group according to X-ray photoelectron spectroscopy in the carbonized color filter layer is set to be greater than that in a color filter layer that-has not been carbonized.

10. A color display using the electrode plate for the color display as recited in any one of claims 7 through 9.

11. The electrode plate for a color display as recited in claim 7, wherein the ratio (Ic-c/Icoo) of a signal (Ic-c) resulting from a C—C bond to a signal (Icoo) resulting from a carboxyl group according to X-ray photoelectron spectroscopy in the carbonized color filter layer is set to be greater than that in a color filter layer that has not been carbonized.

12. An electrode plate for a color display in which a transparent conductive film is formed on a color filter and on an organic protective film that is formed on said color filter for the purpose of protecting said color filter, wherein said electrode plate has a layer, in which said organic protective film is at least partially carbonized, that is formed through processing that uses a discharge under a dry atmosphere having substantially atmospheric pressure between said organic protective film and said transparent conductive film.

13. The electrode plate for a color display as recited in claim 12, wherein an adherent layer made of any of the compounds of a metallic oxide, a metallic nitride, and a metallic oxynitride is disposed between said transparent conductive film and said partially carbonized organic protective film.

14. The electrode plate for a color display as recited in claim 13, wherein the ratio (Ic-c/Icoo) of a signal (Ic-c) resulting from a C—C bond to a signal (Icoo) resulting from a carboxyl group according to X-ray photoelectron spectroscopy in the carbonized organic protective film is set to be greater than that in an organic protective film that has not been carbonized.

15. A color display using the electrode-plate for the color display as recited in any one of claims 12 through 14.

16. The electrode plate for a color display as recited in claim 12, wherein the ratio (Ic-c/Icoo) of a signal (Ic-c) resulting from a C—C bond to a signal (Icoo) resulting from a carboxyl group according to X-ray photoelectron spectroscopy in the carbonized organic protective film is set to be greater than that in an organic protective film that has not been carbonized.

* * * * *